Patented May 27, 1952

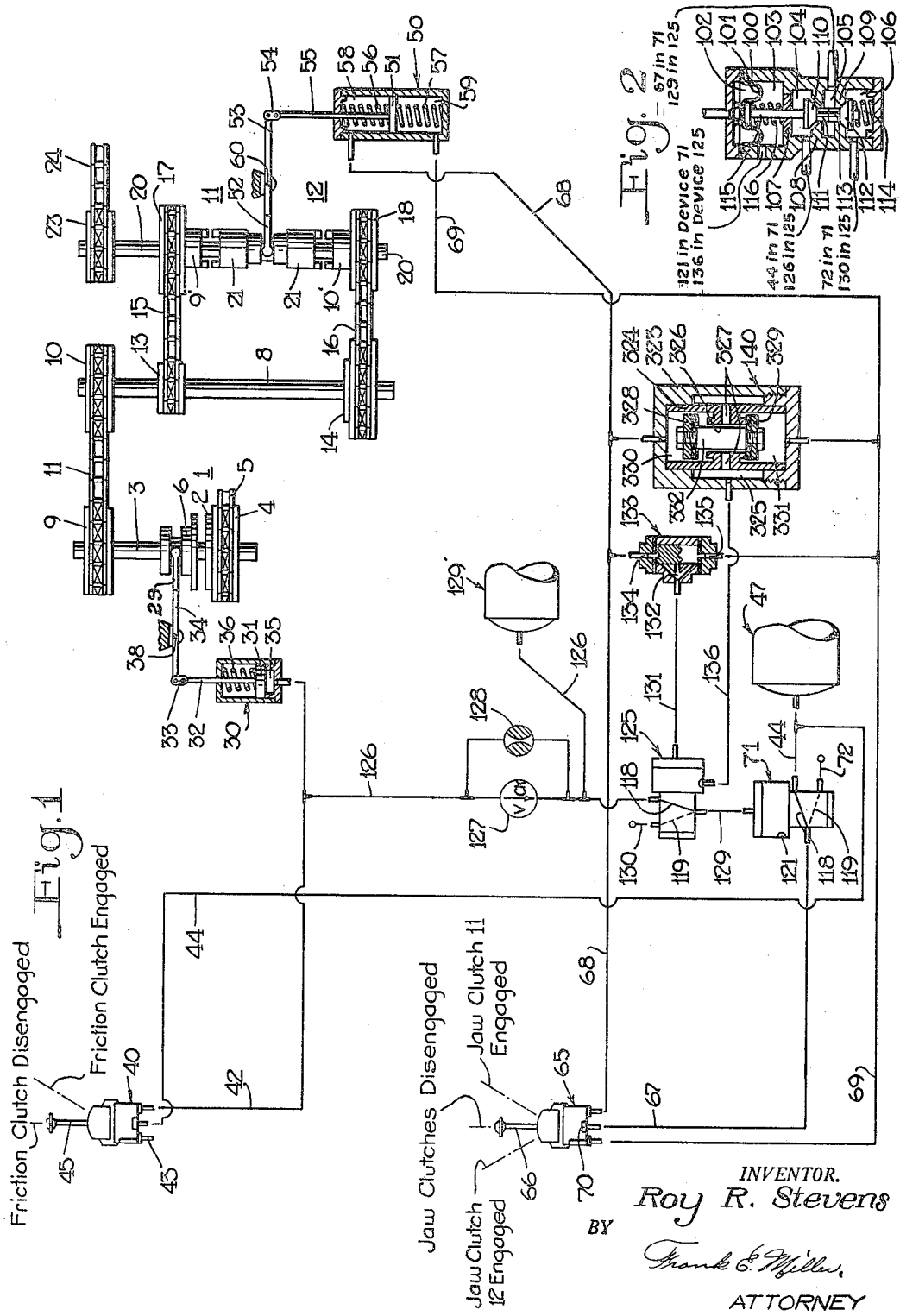

2,598,023

UNITED STATES PATENT OFFICE 2,598,023

FLUID PRESSURE MULTIPLE CLUTCH CONTROL EQUIPMENT

Roy R. Stevens, Forest Hills, Pa., assignor to Westinghouse Air Brake Company, a corporation of Pennsylvania Application August 12, 1949, Serial No. 109,925

9 Claims. (Cl. 60—97)

1

This invention relates to control apparatus and more particularly to means for controlling the selective operation of a plurality of devices such as clutches.

The principal object of the invention is the provision of improved control apparatus for controlling the selective operation of two positive type clutches arranged to be driven through an impositive type clutch, in such manner as will prevent engagement of either of the positive type clutches when the impositive type clutch is engaged so as to prevent damage to the positive type clutches.

Other objects and advantages will be apparent from the following more detailed description of the invention.

In the accompanying drawings; Fig. 1 is a diagrammatic view, partly in outline and partly in section, of control apparatus embodying the invention associated with a clutch system; and Fig. 2 is a schematic sectional view of a relay valve device, several of which are shown in outline in Fig. 1 as comprised in the control apparatus.

Description

The improved control apparatus is shown in the drawing associated with a fluid pressure clutch system for sake of illustrating utility of the invention.

The clutch system may comprise a main friction clutch 1 having a driving element 2 journaled onto an input shaft 3 and attached to a sprocket wheel 4 which may be driven through the medium of a chain 5 by suitable power means (not shown). A driven element 6 is secured for rotation with the input shaft 3 and is slidable axially thereon into and out of frictional contact with the driving element 2 for engaging and disengaging, respectively, the friction clutch 1 to establish and disestablish, respectively, driving connection between the power means and the input shaft 3. The input shaft 3 in turn may be operatively connected to a jaw clutch driving shaft 8 through the medium of sprocket wheels 9, 10 and a chain 11 so that shafts 3 and 8 simultaneously either will be driven or not driven by the power means according to engagement or disengagement, respectively, of the friction clutch 1. The shaft 8 in turn is operatively connected to two driving elements 9' and 10' of two jaw clutches 11 and 12, respectively, through the medium of sprocket wheels 13 and 14 secured to rotate with the shaft 8, chains 15 and 16, and sprocket wheels 17 and 18 attached to the driving

2 elements 9' and 10', respectively. Attached sprocket wheels 17 and 18 and driving elements 9' and 10' are journaled on an output shaft 20 so that same will be driven by the power means along with shafts 3 and 8 when the friction clutch 1 is engaged and will not be so driven when the clutch 1 is disengaged. A driven element 21 common to both of the jaw clutches 11 and 12 is slidably mounted for axial movement along shaft 20 into and out of meshing engagement with the driving elements 9' and 10'. The driven element 21 is operatively connected to the output shaft 20 by such means as a key (not shown) so that when the element 21 is in meshing engagement with either of the driving elements 9' or 10', that is when either of the jaw clutches 11 or 12 is engaged, and when the friction clutch 1 is engaged, a driving connection is established from the output shaft 20 through shafts 3 and 8 to the power means. With either the friction clutch 1 disengaged or both jaw clutches 11 and 12 disengaged, driving connection between the power means and the output shaft 20 will be disestablished. It will also be seen that driving connection between the output shaft 20 and the jaw clutch input shaft 8 will be disestablished when both jaw clutches 11 and 12 are disengaged and established when either is engaged. The output shaft 20 is adapted through provision of a sprocket wheel 23 and chain 24 to be operatively connected to a device to be driven (not shown). The ratio of diameters of the sprocket wheel combinations 13, 17 and 14, 18 may be such as will afford two different operating speeds of the output shaft 20 to give two different speeds of operation of the device to be driven, thereby supporting practical utility of the clutch system with which the control apparatus embodying the invention is associated for controlling operation of same.

The improved control apparatus embodying the invention comprises a fluid pressure friction clutch actuator 30 operatively connected to the driven element 6 through the medium of a clevis 29 slidably disposed in the usual fashion within a peripheral annular groove formed in said element for moving same into and out of engagement with the driving element 2 for thereby engaging and disengaging the friction clutch 1. The clutch actuator 30, for sake of illustration, schematically may simply comprise a cylindrical casing in which is slidably disposed a piston 31 operatively connected by means of a piston rod 32 and link 33 to a pivoted clevis arm 34. Upon supply of fluid under pressure to a pressure chamber 35 at one side of the piston 31 same will be caused to move against action of a return spring 36 in a non-pressure chamber at its opposite side to engage the friction clutch 1 through movement of the clevis arm 34 about a fixed pivot pin 38. Upon release of fluid under pressure from the chamber 35, the spring 36 will return the piston 31 to the position in which it is shown in the drawing in contact with a shoulder formed in an end wall of the casing, thereby causing the friction clutch 1 to be disengaged, as it is shown in the drawing.

For controlling supply and release of fluid under pressure to and from the pressure chamber 35 in the actuator 30, and therefore engagement and disengagement of the friction clutch 1, a friction clutch control device 40 is provided. The friction clutch control valve device 40 may be of any suitable structure, such, for example, as the type disclosed in Patent No. 2,329,742, issued to Rankin J. Bush et al. on September 21, 1943, to which may be connected two control pipes 42, 43 and a fluid pressure supply pipe 44 and which comprises an operator's handle 45 movable from a neutral position, in which it is shown in the drawing with both control pipes 42, 43 vented, to either of two positions at opposite sides of neutral to effect supply of fluid under pressure from the supply pipe 44 to one or the other of the control pipes. As the device 40 is employed in the present apparatus, the control pipe 42 is connected at its opposite end to the pressure chamber 35 in the friction clutch actuator 30, the control pipe 43 may be blanked off since there is no need for same, and the supply pipe 44 may be connected to a fluid pressure supply reservoir 47 which may be kept supplied with a suitable volume of fluid under pressure from such as a fluid compressor (not shown) to furnish a source of working fluid for the control apparatus. Only two positions of the handle 45 may be considered for controlling operation of the friction clutch 1, the neutral position in which it is shown in the drawing and indicated by a dot-and-dash line titled "friction clutch disengaged" and in which the control pipe 42, hence chamber 35 in actuator 30, is vented, with the friction clutch 1 consequently disengaged, and one position out of neutral indicated by a dot-and-dash line titled "friction clutch engaged" in which position the control pipe 42, hence the pressure chamber 35, will be charged with fluid under pressure and in which the friction clutch 1 consequently will be engaged.

The control apparatus further comprises a jaw clutch actuator 50 for effecting engagement and disengagement of the jaw clutches selectively. The actuator 50 may comprise a cylindrical casing having a piston 51 slidably disposed therein which is operatively connected to the driven element 21 of the jaw clutches 11, 12 through the medium of a clevis 52, an attached pivotal arm 53, a link 54 and a piston rod 55. Return springs 56 and 57 disposed in pressure chambers 58 and 59, respectively, at opposite sides of the piston 51 urge the piston toward a neutral position in which it is shown in the drawing and in which both of the jaw clutches 11, 12 are disengaged, with the driven element 21 out of meshing engagement with the driving elements 9' and 10'. Upon supply of fluid under pressure to the chamber 58, with the chamber 59 vented, resultant movement of the piston 51 will cause engagement of the jaw clutch 11, while subsequent venting of both chambers 58 and 59 will effect return of the piston 51 to its neutral position in which both of the jaw clutches 11 and 12 are disengaged. Conversely, upon supply of fluid under pressure to the chamber 59 while chamber 58 remains vented, resultant movement of the piston 51 will cause engagement of the jaw clutch 12 through rocking movement of the clevis arm 53 about a fixed pivot pin 60. Upon subsequent venting of both chambers 58 and 59 to atmosphere, the piston 51 will be returned to its neutral position with both jaw clutches 11 and 12 consequently disengaged.

For controlling operation of the actuator 50 and thereby the jaw clutches 11 and 12 an operator's control device 65, which may be similar to the operator's control device 40, is provided. The control device 65 is connected to a fluid pressure supply pipe 67 and to control pipes 68 and 69 which in turn are connected to chambers 58 and 59, respectively, in the actuator 50. An operator's handle 66 of the control valve device 65 is movable to any one of three positions indicated in the drawing by dot-and-dash lines titled "jaw clutches disengaged," "jaw clutch 11 engaged" and "jaw clutch 12 engaged," respectively. In "jaw clutch 11 engaged" position of handle 66, the control pipe 68 will be connected to the supply pipe 67, while the control pipe 69 will be connected to an atmospheric port 70 in the casing of the valve device. In "jaw clutch 12 engaged" position of the handle 66, the control pipe 69 will be connected to the supply pipe 67 while the control pipe 68 will be connected to the atmospheric port 70. In "jaw clutches disengaged" position of the handle 66, both of the control pipes 68 and 69 will be connected to the atmospheric port 70.

According to a feature of the invention, a relay valve device 71 is provided which is operable to establish communication between the supply pipe 67 and either the fluid pressure supply pipe 44, hence reservoir 47, or an exhaust pipe 72 which is constantly open to atmosphere. When a communication 118, indicated in the drawing symbolically by a solid line appearing within the general outline of the relay valve device, is established between supply pipes 67 and 44, fluid under pressure from the supply reservoir 47 is available to the control valve device 65 for supply to one or the other of chambers 58, 59 in actuator 50 when operator's handle 66 is moved to either of its clutch engaging positions to establish connection between one or the other pipes 68, 69, respectively, and said supply pipe 67. One or the other jaw clutches 11, 12 will thus be engaged according to which chamber, 58 or 59, in actuator 50 becomes charged in above manner. If, conversely, a communication 119, indicated symbolically in the drawing by a dash line appearing within the general outline of the valve device 71, is established, the supply pipe 67 becomes disconnected from the supply pipe 44 and becomes connected to the exhaust pipe 72, whereupon fluid under pressure from whichever of the chambers 58, 59 in actuator 50 was charged at the time will release to atmosphere by way of the respective control pipe 68 or 69, the control valve device 65, the supply pipe 67, communication 119 in relay valve device 71 and the exhaust pipe 72, thereby effecting disengagement of the respective jaw clutch 11 or 12 which had been engaged at the time. It will be appreciated that when communication 119 in relay valve device 71 is established movement of the operator's handle 66 of control valve device 65 to either of its clutch engaging positions will not effect engagement of jaw clutches 11, 12 since no fluid under pressure can be supplied to either of the control pipes 68, 69 with pipe 67 vented to atmosphere via said communication 119. If, however, were communication 118 to be reestablished when operator's handle 66 of the control valve device 65 is in either of its clutch engaging positions, fluid under pressure would flow from the pipe 44, said communication 118, the pipe 67, the device 65, and the respective control pipe 68 or 69, to the respective chamber 58 or 59 in the actuator 50 to cause reengagement of the respective jaw clutch 11 or 12 according to whichever of the clutch engaging positions the operator's handle 66 was allowed to remain in.

Referring to Fig. 2 schematically, in detail the type of relay valve device which may be employed as the relay valve device 71 and a relay valve device 125, the function of which will be set forth hereinafter, may comprise a casing 100 having a diaphragm 101 disposed therein and subject to pressure of fluid in a diaphragm control chamber 102 at its one side and to pressure of fluid in a chamber 103 at its opposite side. Also formed in the casing are chambers 104, 105 and 106, chamber 104 being separated from the chamber 103 by a partition 107 and from the chamber 105 by a partition 108. A partition 109 separates the chamber 105 from the chamber 106. A valve 110 is disposed in the chamber 104 for controlling communication between the chamber 105 and said chamber 104. The valve 110 may be secured to a fluted stem 111 slidably mounted in a suitable bore extending through the partition 108, a valve seat being formed at the end of the bore opening into the chamber 104 to accommodate the valve 110. A valve 112, similar to the valve 110, is disposed in the chamber 106 for controlling communication between the chamber 105 and said chamber 106. The valve 112 is attached to a fluted stem 113 which is slidably disposed in a suitable bore extending through the partition 109, a valve seat being formed in the end of said bore opening into the chamber 106 to accommodate the valve 112. Both of the fluted stems 111 and 113 project into and meet in the chamber 105. A bias spring 114 is disposed in the chamber 106 and arranged to urge the valve 112 towards its seat and at the same time, through engagement of stems 111 and 113, to urge the valve 110 away from its seat. The valve 110 is operably connected to the diaphragm 101 by means of a rod or stem 115 which extends through a bore in the partition 107. A control spring 116 is provided in the chamber 103 to oppose deflection of the diaphragm 101 in the direction of the chamber 103.

In operation of the relay valve device shown in Fig. 2, with the chamber 103 open to atmosphere, upon supply of fluid under pressure to the control chamber 102, the diaphragm 101 will deflect in the direction of the chamber 103 against opposition of the control spring 116 and the bias spring 114 and will cause seating of the valve 110 and unseating of the valve 112. With the valve 110 closed and valve 112 open, chamber 105 will be closed to the chamber 104 and open to the chamber 106. Upon subsequent venting of fluid under pressure from the control chamber 102, the bias spring 114 and the control spring 116 will return the diaphragm 101 and valves 110 and 112 to the positions in which they are shown in the drawing, the valve 112 being seated and the valve 110 being unseated. With valve 110 unseated and the valve 112 seated, the chamber 105 will be closed to the chamber 106 and open to the chamber 104.

If, however, the chamber 103 is charged with fluid at substantially the same pressure as fluid being supplied to the chamber 102, as at times becomes the case where the device of Fig. 2 is employed as the relay valve device 125, it will be seen that the effect of pressure of fluid in chamber 102 acting on one face of the diaphragm 101 will be nullified by the equal effect of pressure of fluid in chamber 103 acting on the opposite face of the diaphragm, so that same will not be deflected by such supply of fluid under pressure to chamber 102 with chamber 103 thus charged and the valves 110 and 112 will remain unseated and seated, respectively. If while the control chamber 102 and the chamber 103 are charged with fluid under pressure, said chamber 103 is vented to atmosphere, fluid under pressure will release therefrom and will allow the pressure of fluid in the control chamber to deflect the diaphragm and seat the valve 110 while simultaneously unseating the valve 112. If, on the other hand, when the control chamber 102 is charged with fluid under pressure, and the diaphragm 101 is deflected thereby with chamber 103 vented to atmosphere, fluid under pressure is supplied to the chamber 103, pressure forces on opposite faces of the diaphragm will again be balanced, and the springs 114 and 116 will return the diaphragm and valves 110 and 112 to the positions in which they are shown in the drawing, that is, unseated and seated, respectively.

In describing operation of the relay valve devices 71, 125 in the apparatus shown in outline in Fig. 1 which are similar to the device shown in detail in Fig. 2, the communication 118, shown symbolically by the solid line in Fig. 1, will imply that connection which is either established or disestablished between the chambers 104 and 105 according to whether the valve 110 is seated or unseated, respectively, and the communication 119, shown symbolically by the dash line in Fig. 1, will imply that connection which is either established or disestablished between the chambers 105 and 106 according to whether the valve 112 is seated or unseated, respectively.

In the relay valve device 71, its chamber 103 is constantly open to atmosphere by way of such as a port 121, its chamber 104 is connected to the supply pipe 44, its chamber 105 is connected to the supply pipe 67, and its chamber 106 is connected to the exhaust pipe 72 constantly open to atmosphere.

For controlling supply and release of fluid under pressure to and from the control chamber 102 in the relay valve device 71, hence for controlling operation of said device 71, the previously mentioned relay valve device 125 is provided which is similar in structure and operation to the previously described relay valve device shown in detail in Fig. 2. In the relay valve device 125, its chamber 104 has a connection with the control pipe 42 by way of a pipe 126 and a check valve 127 and choke 128 arranged in parallel and with a volume reservoir 129', for reasons which will be set forth hereinafter. Also in relay valve device 125, its chamber 105 is connected to the control chamber 102 in the relay valve device 71 by way of a pipe 129; its chamber 106 is connected to an exhaust pipe 130 which is constantly open to atmosphere; its control chamber 102 is connected by way of a pipe 131 to an outlet opening 132 of a shuttle valve device 133, opposite inlet openings 134, 135 of which are connected to the control pipes 68 and 69, respectively; and its chamber 103 is connected by way of a pipe 136 to an outlet chamber 325 of an inverse double check valve device 140, opposite inlet chambers of which are connected to the control pipes 68, 69, respectively, as will be described subsequently.

The inverse double check valve device 140 schematically may comprise a casing 323 having a bushing 324 which is encircled midway between its ends by the chamber 325 connected to the pipe 136. The bushing 324 is provided interiorly and midway between its ends with a bridge having an axial bore 326 open to the chamber 325 through a plurality of radial openings 327. At opposite ends of the bore 326 are annular seats arranged for sealing engagement by respective valves 328, 329 contained in chambers 330, 331, respectively. The two valves 328 and 329 are connected for movement in unison by a stem 332 extending with clearance through the bore 326. This stem is of such construction as will allow flow of fluid under pressure past either valve 328 or 329, when unseated, through the bore 326 to the annular chamber 325. The chamber 330 is connected to the control pipe 68 and the chamber 331 is connected to the control pipe 69.

In operation of the inverse double check valve device 140, when only one of the pipes 68, 69 is charged with fluid under pressure, the respective valve 328 or 329 will close to prevent fluid under pressure from flowing into the pipe 136 to chamber 103 in the relay valve device 125, while the pipe 136 remains vented by way of the other unseated valve 328 or 329 and the respective uncharged control pipe 68 or 69. When both of the pipes 68 and 69 become charged with fluid under pressure, fluid under pressure will flow from one or the other of these pipes by way of whichever of the valves 328, 329 is unseated, into the pipe 136 to the chamber 103 in the relay valve device 125.

*Operation*

In operation of the control apparatus, assume that the reservoir 47 is charged with fluid under pressure and that the respective operator's handles of the control valve devices 40 and 65 are in their respective neutral positions in which they are shown in the drawing with the control pipes 42, 68, and 69 vented to atmosphere. All clutches 1, 11 and 12 will be disengaged. The control chamber 102 in the relay valve device 125 will be void of fluid under pressure with same vented to atmosphere by way of the shuttle valve device 133 and one or the other of the control pipes 68, 69. The chamber 103 in the relay valve device 125 will be void of fluid under pressure with same vented to atmosphere by way of the inverse double check valve device 140 and one or the other of the control pipes 68, 69. With its control chamber 102 thus void of fluid under pressure, the relay valve device 125 will be in its position establishing the communication 118 which connects the pipe 126 to the pipe 129 so that the control chamber 102 in the relay valve device 71 will be vented to atmosphere at this time by way of the pipe 129, said communication 118, the pipe 126 and choke 128 therein, and the control pipe 42. The relay valve device 71 thus will be so conditioned as to maintain its communication 118 established, connecting the supply pipe 67 to the supply pipe 44 so that fluid under pressure from the reservoir 47 will be available to the operator's control device 65 via said communication 118.

Assume now that through operation of the control valve device 40 fluid under pressure is supplied to the control pipe 42 for effecting engagement of the friction clutch 1 as will be appreciated from previous description. Such fluid under pressure thus supplied to the control pipe 42 will flow by way of the pipe 126 and the check valve 127 to the volume reservoir 129' and by way of the communication 118 in the relay valve device 125 and the pipe 129 to the control chamber in the relay valve device 71. The relay valve device 71 will then respond to disestablish its communication 118 which connects pipe 67 with pipe 44 and to establish its comunication 119 which connects the pipe 67 to the exhaust pipe 72 so that no supply of fluid under pressure will be available to the jaw clutch control valve device 65. Neither of the jaw clutches 11 or 12 may then be engaged through operation of the valve device 65 with the driving connection through the engaged friction clutch 1 in existence, therefore precluding damage to the jaw clutches were same to be engaged with their driving elements 9', 10' rotated through said engaged friction clutch.

Upon subsequent venting of the control pipe 42 by operation of the friction clutch control valve device 40, fluid under pressure will release slowly from the control chamber in the relay valve device 71 by way of communication 118 in the relay valve device 125, the pipe 126 and choke 128 therein and the control pipe 42. The relay valve device 71 will then respond to reestablish its communication 118 for allowing supply of fluid from reservoir 47 to reach the jaw clutch control valve device 65 via pipe 67 so that either of the jaw clutches 11 or 12 may then be engaged through effecting supply of fluid under pressure to the respective control pipe 68 or 69. The choke 128 so times the above described release of fluid under pressure from the control chamber 102 in the relay valve device 71 as to allow the jaw clutch input shaft 8 to come to rest upon disengagement of the friction clutch 1 before the jaw clutch control valve device 65 is rendered effective to engage either of the jaw clutches.

Now assume that with the control pipe 42 vented and the friction clutch 1 therefore disengaged, fluid under pressure is supplied to one or the other of the control pipes 68 or 69 to cause engagement of a respective jaw clutch 11 or 12. Such fluid under pressure will flow from the charged control pipe 68 or 69 by way of the shuttle valve device 133 and the pipe 131 to the control chamber 102 in the relay valve device 125. The chamber 103 in the relay valve device 125 will remain vented at this time by way of the pipe 136, the inverse double check valve device 140 and the vented one of the control pipes 68 or 69, as will be appreciated from previous description. The relay valve device 125 will then respond to disestablish its communication 118 which connects pipe 129 to the pipe 126 and establish its communication 119 which connects the pipe 129 to the exhaust pipe 130, hence to atmosphere. The status of the relay valve device 71 will remain the same at this time with its communication 118 established and connecting the pipe 67 to the pipe 44 so that the respective control pipe 68 or 69 will remain charged with fluid under pressure from reservoir 47 via control valve device 65 and the respective jaw clutch 11 or 12 will remain engaged.

Now the friction clutch 1 may be engaged through supply of fluid under pressure to the control pipe 42 by operation of the control valve device 40 while the respective jaw clutch 11 or 12 remains engaged to establish driving connection between the power input shaft 3 and the power output shaft 20. Such fluid under pressure will flow from the control pipe 42 by way of the pipe 126 and check valve 127 to the volume reservoir 129' which thereby becomes charged for reasons which will hereinafter become apparent. Fluid under pressure thus supplied to the pipe 126 at this time will be prevented from reaching the control chamber 102 of the relay valve device 71 by the relay valve device 125 which will remain positioned with its communication 118 disestablished and its communication 119 established thereby maintaining pipe 129, hence said control chamber, vented to atmosphere via pipe 130. The respective control pipe 68 or 69 will remain charged with fluid under pressure by virtue of connection with reservoir 47 by way of the control valve device 65, pipe 67, communication 118 in relay valve device 71, and the pipe 44 so that it will be seen that the respective jaw clutch 11 or 12 will remain engaged when the friction clutch 1 is subsequently engaged.

Now assume that with one of the jaw clutches, 11 or 12 and the friction clutch 1 engaged it is desired to disengage that particular jaw clutch and to engage the other of the jaw clutches, 11 or 12. If such is accomplished by moving the operator's handle 66 from its one jaw clutch engaging position first to its neutral position and then after a pause to its other jaw clutch engaging position, both control pipes 68 and 69 will be connected to the exhaust port 70 in the neutral position of the handle 66 while fluid under pressure releases from clutch actuator 50 by way of the respective control pipe 68 or 69 and the port 70 in control valve device 65 to disengage the previously engaged jaw clutch 11 or 12. With sufficient pause before moving the operator's handle from its neutral position 66 to its other jaw clutch engaging position, fluid under pressure will also release from the control chamber in the relay valve device 125 by way of the pipe 131, shuttle valve device 133 and one or the other of the two vented control pipes 68, 69 to allow the relay valve device 125 to reestablish its communication 118. Upon such establishment of communication 118 in relay valve device 125 fluid under pressure will flow from the control pipe 42 and from the volume reservoir 129' by way of pipe 126, said communication, and the pipe 129 to the control chamber in the relay valve device 71 which will respond thereto to disestablish its communication 118 which connects pipe 67 with pipe 44 and to establish its communication 119 which vents the supply pipe 67 to atmosphere by way of exhaust pipe 72. When the operator's handle 66 is then moved from its neutral position to the desired clutch engaging position, the respective control pipe 68 or 69 will be connected through the control device 65 to the vented supply pipe 67 so that both jaw clutches 11 and 12 will remain disengaged.

With the operator's handle 66 thus in a clutch engaging position and the supply pipe 67 vented via relay valve device 71 so that both jaw clutches 11 and 12 are disengaged, the friction clutch 1 may be disengaged to allow for the desired engagement of the respective jaw clutch through venting of the control pipe 42 by operation of the valve device 40. Such venting of the control pipe 42 will allow slow release of fluid under pressure from the control chamber in the relay valve device 71 by way of communication 118 in the relay valve device 125, pipe 126 and the choke 128 while the jaw clutch input shaft 8 slows down to a stop upon disengagement of the friction clutch 1. When release of fluid under pressure from the control chamber in the relay valve device 71 is substantially complete, the communication 118 in said device will be established to connect the supply pipe 67 to the pipe 44, whereupon fluid under pressure will flow by way of the control valve device 65 to the respective control pipe 68 or 69 to cause engagement of the respective jaw clutch 11 or 12, it being assumed that handle 66 of device 65 is allowed to remain in a jaw clutch engaging position.

Such fluid under pressure thus supplied to the respective control pipe 68 or 69 will flow by way of the shuttle valve device 133 and the pipe 131 to the control chamber in the relay valve device 125, causing same to disestablish its communication 118 and to establish its communication 119 which vents the pipe 129 hence the control chamber in relay valve device 71, to atmosphere via exhaust pipe 130. The friction clutch 1 may then be engaged through supply of fluid under pressure to the control pipe 42 and such fluid under pressure will flow by way of the pipe 126 and check valve 127 to the volume reservoir 129' to charge same, but will be prevented by relay valve device 125 from flowing to the control chamber in the relay valve device 71 which will therefore remain positioned to maintain the supply pipe 67 connected to the pipe 44, hence reservoir 47, so that the respective control pipe 68 or 69 will be maintained charged and the respective jaw clutch 11 or 12 therefore will remain engaged along with the friction clutch 1.

Now assume that, with the friction clutch 1 and a respective jaw clutch 11 or 12 engaged and with the relay valve devices positioned establishing their communications 119 and 118 respectively, the operator's handle 66 of the jaw clutch control valve device 65 is moved directly and rapidly from its one jaw clutch engaging position to its opposite jaw clutch engaging position without pause in its neutral position for shifting from one jaw clutch 11 or 12 to the other jaw clutch 11 or 12. Such operation of the control valve device 65 will quickly disconnect one of the control pipes 68 or 69, from the supply pipe 67 and connect same to the exhaust port 70 and will connect the other of the control pipes 68 or 69, to the supply pipe 67 so that fluid under pressure will flow from the pipe 67 into the other control pipe 68 or 69 before fluid under pressure releases from the first control pipe 68 or 69. It will be seen that under such circumstances the control chamber in the relay valve device 125 will be maintained charged with fluid under pressure by way of the shuttle valve device 133 and one or the other of the control pipes 68 or 69 so that the relay device 125 would tend to remain positioned venting the control chamber in relay valve device 71 to atmosphere and therefore preventing venting of the supply pipe 67 to atmosphere to prevent engagement of the other jaw clutch 11 or 12 while the friction clutch 1 is yet engaged. To insure that such jaw clutch engagement will not occur when shifting handle 66 rapidly from one jaw clutch engaging position to the other with the friction clutch 1 engaged, in accordance with a feature of the invention, if both of the control pipes 68 and 69 become charged with fluid under pressure under the above circumstances, such fluid under pressure will flow by way of the inverse double check valve device 140 and the pipe 136 to the chamber 103 in the relay valve device 125 to nullify effect of pressure in the control chamber therein, whereupon said relay valve device 125 will respond to disestablish its communication 119 and establish its communication 118. Fluid under pressure from the volume reservoir 129' will then flow rapidly by way of the communication 118 in relay valve device 125 to the control chamber in the relay valve device 71, causing same to effect the desired venting of the supply pipe 67 by establishment of the respective communication 119 and prevent engagement of the other jaw clutch 11 or 12 while the friction clutch 1 is engaged. With the pipe 67 thus vented, it will be appreciated that both control pipes 68 or 69 will become so vented and that fluid under pressure will therefore release from both the control chamber 102 and the chamber 103 in the relay valve device 125 by way of the shuttle valve device 133 and the inverse double check valve device 140, respectively. The relay valve device 125 will remain in its position connecting the pipe 129, hence the control chamber in relay valve device 71, to the pipe 126, hence to the charged control pipe 42. When the control pipe 42 is vented by operation of the control valve device 40 to effect disengagement of the friction clutch 1, fluid under pressure will release slowly from the control chamber in the relay valve device 71 by way of the relay valve device 125, choke 128 and the pipe 42. When the release of fluid under pressure from the control chamber in the relay valve device 71 is complete, which, due to action of choke 128, will occur only after the jaw clutch input shaft 8 comes to rest, said relay valve device will again respond to effect supply of fluid under pressure to the supply pipe 67 and via valve device 65 to the respective control pipe 68 or 69 to cause engagement of the respective jaw clutch in accord with position of the operator's handle 66.

Upon supply of fluid under pressure to the respective control pipe 68 or 69, such fluid under pressure, as aforedescribed, will flow by way of the shuttle valve device 133 to the relay valve device 125 to cause same to again disconnect the control chamber of relay valve device 71 from the control pipe 42 and to vent said control chamber to atmosphere. The friction clutch 1 may then be reengaged through supply of fluid under pressure to the control pipe 42 and such fluid under pressure will flow via check valve 127 to only the volume reservoir 129' to charge same while relay valve devices 125, 71 maintain connections between pipes 129, 130 and pipes 67, 44, respectively.

Upon return of the operator's handles 45 and 66 of the control valve devices 40 and 65, respectively, to their neutral positions, fluid under pressure will be released from the control pipes 42, 68, 69 to cause disengagement of the clutches 1, 11, 12 and all parts of the control apparatus will assume the positions as originally described and in which they are shown in the drawing.

*Summary*

It will now be seen that I have provided improved control apparatus for controlling the selective operation of two positive type clutches, arranged to be driven through an impositive type clutch, in such a manner as prevents engagement of either of the positive type clutches when the impositive type clutch is engaged, thereby precluding damage to the positive type clutches which otherwise might occur were same to be engaged while their input elements were being driven by the impositive type clutch.

Having now described the invention, what I claim as new and desire to secure by Letters Patent, is:

1. A control system for one fluid pressure actuator and a pair of fluid pressure actuators selectively cooperative with said one actuator comprising, a conduit for conveying fluid under pressure to said one actuator to effect operation, thereof, two control pipes one for each of said pair of fluid pressure actuators, a fluid pressure supply pipe, an operator's control device for selectively establishing a fluid pressure communication between said supply pipe and either one of said two control pipes while opening the other of said two pipes to atmosphere, a source of fluid under pressure, valve means comprising a control element operative by fluid under pressure to vent said fluid pressure supply pipe and upon release of fluid under pressure to open said fluid pressure supply pipe to said source, other valve means responsive to fluid under pressure in one chamber to open said control element to said conduit and to fluid under pressure in another chamber when said one chamber is vented to open said control element to atmosphere, valve means subject opposingly to pressures in said two control pipes for selectively opening said one chamber to the one of said pipes at lower pressure, and other valve means also subject opposingly to pressures in said two pipes for selectively opening said other chamber to the one of said two pipes at higher pressure.

2. A control system for a fluid pressure actuator and a pair of fluid pressure actuators selectively cooperative with said actuator comprising, a conduit for conveying fluid under pressure to said actuator, two control pipes one for each of said pair of fluid pressure actuators, a fluid pressure supply pipe, an operator's control device for selectively establishing a fluid pressure communication between said supply pipe and either one of said two control pipes while opening the other of said two pipes to atmosphere, a source of fluid under pressure, valve means cooperative with said conduit when supplied with fluid under pressure to supply fluid under pressure to said fluid pressure supply pipe in response to pressure of fluid in one chamber and to vent said fluid pressure supply pipe in response to subsequent supply of fluid under pressure to a second chamber, and means controlled by opposing pressures in said pipes for selectively opening said one chamber to the one of said two pipes at higher pressure and said other chamber to the one of said two pipes at lower pressure.

3. A control system for one fluid pressure actuator and a pair of fluid pressure actuators selectively cooperative with said one fluid pressure actuator comprising, control means for selectively effecting operation of each of said actuators, and means operative when said one fluid pressure actuator is operated to prevent operation of either of said pair of fluid pressure actuators upon operation of said control means to effect termination of operation of either of said pair of fluid pressure actuators and operation of the other.

4. A control system for a power transmission including one fluid pressure actuator and a pair of fluid pressure actuators selectively cooperative with said one fluid pressure actuator comprising, control means for selectively effecting operation of each of said pair of fluid pressure actuators, and means operative when said one fluid pressure actuator is in operation to prevent operation of either of said pair of fluid pressure actuators and operative in response to operation of said control means to effect termination of operation of said one fluid pressure actuator to effect operation of the selected one of the pair of actuators.

5. A control system for one fluid pressure actuator and a pair of fluid pressure actuators selectively cooperative with said one fluid pressure actuator comprising, a first control means for controlling operation of said one fluid pressure actuator, a second control means for selectively controlling operation of either of said pair of fluid pressure actuators, and means operative when said one fluid pressure actuator and one of said pair of fluid pressure actuators are in operation, upon operation of said second control means to terminate operation of the operated one of said pair and operation of the other of said pair, to prevent such operation of the other of said pair except in response to operation of said first control means to terminate operation of said one fluid pressure actuator.

6. In combination with a source of fluid under pressure, a first control pipe, second and third control pipes, first fluid pressure actuator means operated by supply of fluid under pressure to said first control pipe, second and third means operated in response to supply of fluid under pressure to said second and third control pipes, respectively, a fluid pressure supply pipe, control means operable to either of two positions to establish connection between said supply pipe and either of said control pipes, respectively, while venting the other of said control pipes, first relay valve means responsive to supply and release, respectively, of fluid under pressure to and from a first control chamber to establish either a first fluid pressure communication between said supply pipe and atmosphere or a second fluid pressure communication between said supply pipe and said source, second relay valve means responsive to supply and release, respectively, of fluid under pressure to and from a second control chamber when another chamber is void of fluid under pressure to establish either a third fluid pressure communication between said first control chamber and atmosphere or a fourth fluid pressure communication between said control chamber and said first control pipe and responsive to supply of fluid under pressure to said other chamber to establish said fourth communication, shuttle valve means having opposite inlet openings connected to said second and third control pipes, respectively, and an outlet opening connected to said second control chamber, and inverse double check valve means operable in response to pressurization of both of said control pipes to effect supply of fluid under pressure from one of said control pipes to said other chamber and, when either or both of said control pipes are vented, to effect venting of said other chamber.

7. The combination as set forth in claim 6, including check valve and choke means in said fourth communication to allow for facile flow of fluid under pressure from said first control pipe to said first control chamber and restricted flow in the opposite direction.

8. The combination as set forth in claim 6, including fluid storing means in said fourth communication.

9. A control mechanism for one actuator and a pair of actuators, comprising a source of fluid under pressure, a fluid pressure supply pipe, valve means for selectively establishing communication between said supply pipe and one or the other of said pair of actuators, first interlock means responsive to pressurization of said one actuator to disestablish communication between said supply pipe and said source and establish communication between said supply pipe and atmosphere, second interlock means responsive to pressurization of either one of said pair of actuators to render said first interlock means non-responsive to pressurization of said one actuator, and third interlock means responsive to pressurization of both of said pair of actuators to render said second interlock means ineffective and said first interlock means therefore effective.

ROY R. STEVENS.

REFERENCES CITED

The following references are of record in the file of this patent:

UNITED STATES PATENTS

| Number | Name | Date |
| --- | --- | --- |
| 2,286,873 | Schwartz | June 16, 1942 |
| 2,464,986 | Miller | Mar. 22, 1949 |